US012279290B2

(12) United States Patent
Manolakos et al.

(10) Patent No.: US 12,279,290 B2
(45) Date of Patent: Apr. 15, 2025

(54) DEMODULATION REFERENCE SIGNAL GROUPING FOR FULL DUPLEX WIRELESS COMMUNICATIONS

(71) Applicant: QUALCOMM Incorporated, San Diego, CA (US)

(72) Inventors: Alexandros Manolakos, Escondido, CA (US); Seyedkianoush Hosseini, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 16/983,651

(22) Filed: Aug. 3, 2020

(65) Prior Publication Data

US 2021/0321404 A1     Oct. 14, 2021

Related U.S. Application Data

(60) Provisional application No. 63/008,616, filed on Apr. 10, 2020.

(51) Int. Cl.
*H04W 72/53* (2023.01)
*H04L 5/00* (2006.01)
(Continued)

(52) U.S. Cl.
CPC ........... *H04W 72/53* (2023.01); *H04L 5/0007* (2013.01); *H04L 5/0048* (2013.01); *H04L 5/14* (2013.01);
(Continued)

(58) Field of Classification Search
CPC ........... H04W 72/0493; H04W 72/042; H04W 72/044; H04W 72/0446; H04L 5/0007;
(Continued)

(56) References Cited

U.S. PATENT DOCUMENTS

2018/0092002 A1   3/2018   Manolakos et al.
2019/0089504 A1   3/2019   Hwang et al.
(Continued)

FOREIGN PATENT DOCUMENTS

CN     104753575 A     7/2015
EP       3664559 A1    6/2020
(Continued)

OTHER PUBLICATIONS

International Search Report and Written Opinion—PCT/US2021/021736—ISA/EPO—Jun. 28, 2021.
(Continued)

*Primary Examiner* — Ian N Moore
*Assistant Examiner* — Brian T Le
(74) *Attorney, Agent, or Firm* — Guang Y. Zhang; Norton Rose Fulbright US LLP

(57) ABSTRACT

A method of wireless communication includes receiving, by a user equipment (UE) device, control information indicating a condition associated with a demodulation reference signal (DMRS) grouping characteristic of a DMRS that is to be wirelessly communicated using one or more physical (PHY) channels. The method further includes performing the wireless communication based on the DMRS grouping characteristic indicated by the control information. The wireless communication is performed in response to detecting, by the UE device, that a first full duplex resource configuration associated with a first slot of a plurality of slots of a wireless communication and a second full duplex resource configuration associated with a second slot of the plurality of slots satisfy the condition.

29 Claims, 11 Drawing Sheets

(51) Int. Cl.
*H04L 5/14* (2006.01)
*H04W 72/044* (2023.01)
*H04W 72/23* (2023.01)

(52) U.S. Cl.
CPC ......... *H04W 72/044* (2013.01); *H04W 72/23* (2023.01)

(58) Field of Classification Search
CPC ......... H04L 5/0048; H04L 5/14; H04L 5/005; H04L 5/0051; H04L 25/22; H04B 3/20; H04Q 3/20
See application file for complete search history.

(56) References Cited

U.S. PATENT DOCUMENTS

| | | | |
|---|---|---|---|
| 2019/0363843 A1* | 11/2019 | Gordaychik | H04W 52/58 |
| 2020/0187177 A1* | 6/2020 | Lee | H04W 72/12 |
| 2021/0219278 A1* | 7/2021 | Hu | H04L 5/0048 |
| 2021/0235440 A1* | 7/2021 | Liang | H04W 72/21 |
| 2022/0029761 A1* | 1/2022 | Su | H04L 27/2613 |

FOREIGN PATENT DOCUMENTS

| | | |
|---|---|---|
| WO | WO-2019195103 A1 | 10/2019 |
| WO | WO-2019203547 A1 | 10/2019 |

OTHER PUBLICATIONS

Qualcomm: "Remaining Issues on NR DM-RS", R1-1716783, 3GPP TSG RAN WG1 Meeting NR#3, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18-21, 2017, Sep. 25, 2017 (Sep. 25, 2017), 30 Pages, XP051353912, Retrieved from the Internet: URL: http://www.3gpp.org/ftp/tsg_ran/WG1_RL1/TSGR1_AH/NR_AH_1709/Docs/ [retrieved on—Sep. 25, 2017], 4.5.2 DL DMRS bundling in time domain.

Vivo: "On DL DMRS Design", 3GPP TSG RAN WG1 Meeting NR Ad-Hoc#2, 3GPP Draft; R1-1710402 On DL DMRS Design, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27, 2017-Jun. 30, 2017, Jun. 26, 2017 (Jun. 26, 2017), 5 Pages, XP051299614, Retrieved from the Internet: URL: https://www.3gpp.org/ftp/TSG_RAN/WG1_RL1/TSGR1_AH/NR_AH_1706/Docs/R1-1710402.zip, [retrieved on Jun. 26, 2017].

\* cited by examiner

DEMODULATION REFERENCE SIGNAL GROUPING FOR FULL DUPLEX WIRELESS COMMUNICATIONS

CROSS-REFERENCE TO RELATED APPLICATIONS

This application claims the benefit of and priority to U.S. Prov. Pat. App. No. 63/008,616, entitled "DEMODULATION REFERENCE SIGNAL GROUPING FOR FULL DUPLEX WIRELESS COMMUNICATIONS" and filed on Apr. 10, 2020, which is expressly incorporated by reference herein in its entirety.

TECHNICAL FIELD

Aspects of the present disclosure relate generally to wireless communication systems, and more particularly, to wireless communication systems that use full duplex communications.

DESCRIPTION OF THE RELATED TECHNOLOGY

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In some aspects of the disclosure, a method of wireless communication includes receiving, by a user equipment (UE) device, control information indicating a condition associated with a demodulation reference signal (DMRS) grouping characteristic of a DMRS that is to be wirelessly communicated using one or more physical (PHY) channels. The method further includes performing the wireless communication based on the DMRS grouping characteristic indicated by the control information. The wireless communication is performed in response to detecting, by the UE device, that a first full duplex resource configuration associated with a first slot of a plurality of slots of a wireless communication and a second full duplex resource configuration associated with a second slot of the plurality of slots satisfy the condition.

In some other aspects of the disclosure, a method of wireless communication includes receiving, by a base station, control information indicating a condition associated with a DMRS grouping characteristic of a DMRS that is to be wirelessly communicated using one or more PHY channels. The method further includes performing the wireless communication based on the DMRS grouping characteristic indicated by the control information. The wireless communication is performed in response to detecting, by the base station, that a first full duplex resource configuration associated with a first slot of a plurality of slots of a wireless communication and a second full duplex resource configuration associated with a second slot of the plurality of slots satisfy the condition.

In some other aspects of the disclosure, an apparatus includes a memory and a processor coupled to the memory. The processor is configured to receive, at a UE device, control information indicating a condition associated with a DMRS grouping characteristic of a DMRS that is to be wirelessly communicated using one or more PHY channels. The processor is further configured to perform the wireless communication based on the DMRS grouping characteristic indicated by the control information. The wireless communication is performed in response to detecting, by the UE device, that a first full duplex resource configuration associated with a first slot of a plurality of slots of a wireless communication and a second full duplex resource configuration associated with a second slot of the plurality of slots satisfy the condition.

In some other aspects of the disclosure, an apparatus includes a memory and a processor coupled to the memory. The processor is configured to receive, at a base station, control information indicating a condition associated with a DMRS grouping characteristic of a DMRS that is to be wirelessly communicated using one or more PHY channels. The processor is further configured to perform the wireless communication based on the DMRS grouping characteristic indicated by the control information. The wireless communication is performed in response to detecting, by the base station, that a first full duplex resource configuration associated with a first slot of a plurality of slots of a wireless communication and a second full duplex resource configuration associated with a second slot of the plurality of slots satisfy the condition.

In some other aspects of the disclosure, a computer-readable medium stores instructions executable by a processor to perform operations. The operations include receiving, by a UE device, control information indicating a condition associated with a DMRS grouping characteristic of a DMRS that is to be wirelessly communicated using one or more PHY channels. The method further includes performing the wireless communication based on the DMRS grouping characteristic indicated by the control information. The wireless communication is performed in response to detecting, by the UE device, that a first full duplex resource configuration associated with a first slot of a plurality of slots of a wireless communication and a second full duplex resource configuration associated with a second slot of the plurality of slots satisfy the condition.

In some other aspects of the disclosure, a computer-readable medium stores instructions executable by a processor to perform operations. The operations include receiving, by a base station, control information indicating a condition associated with a DMRS grouping characteristic of a DMRS that is to be wirelessly communicated using one or more PHY channels. The method further includes performing the wireless communication based on the DMRS grouping characteristic indicated by the control information. The wireless communication is performed in response to detecting, by the base station, that a first full duplex resource configuration associated with a first slot of a plurality of slots of a wireless communication and a second full duplex resource configuration associated with a second slot of the plurality of slots satisfy the condition.

In some other aspects of the disclosure, an apparatus includes means for storing instructions. The apparatus further includes means for executing the instructions to receive, at a UE device, control information indicating a condition associated with a DMRS grouping characteristic of a DMRS that is to be wirelessly communicated using one or more PHY channels. The means for executing the instructions is configured to perform the wireless communication based on the DMRS grouping characteristic indicated by the control information. The wireless communication is performed in response to detecting, by the UE device, that a first full duplex resource configuration associated with a first slot of a plurality of slots of a wireless communication and a second full duplex resource configuration associated with a second slot of the plurality of slots satisfy the condition.

In some other aspects of the disclosure, an apparatus includes means for storing instructions. The apparatus further includes means for executing the instructions to receive, at a base station, control information indicating a condition associated with a DMRS grouping characteristic of a DMRS that is to be wirelessly communicated using one or more PHY channels. The means for executing the instructions is configured to perform the wireless communication based on the DMRS grouping characteristic indicated by the control information. The wireless communication is performed in response to detecting, by the base station, that a first full duplex resource configuration associated with a first slot of a plurality of slots of a wireless communication and a second full duplex resource configuration associated with a second slot of the plurality of slots satisfy the condition.

BRIEF DESCRIPTION OF THE DRAWINGS

A further understanding of the nature and advantages of the present disclosure may be realized by reference to the following drawings. In the drawings, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
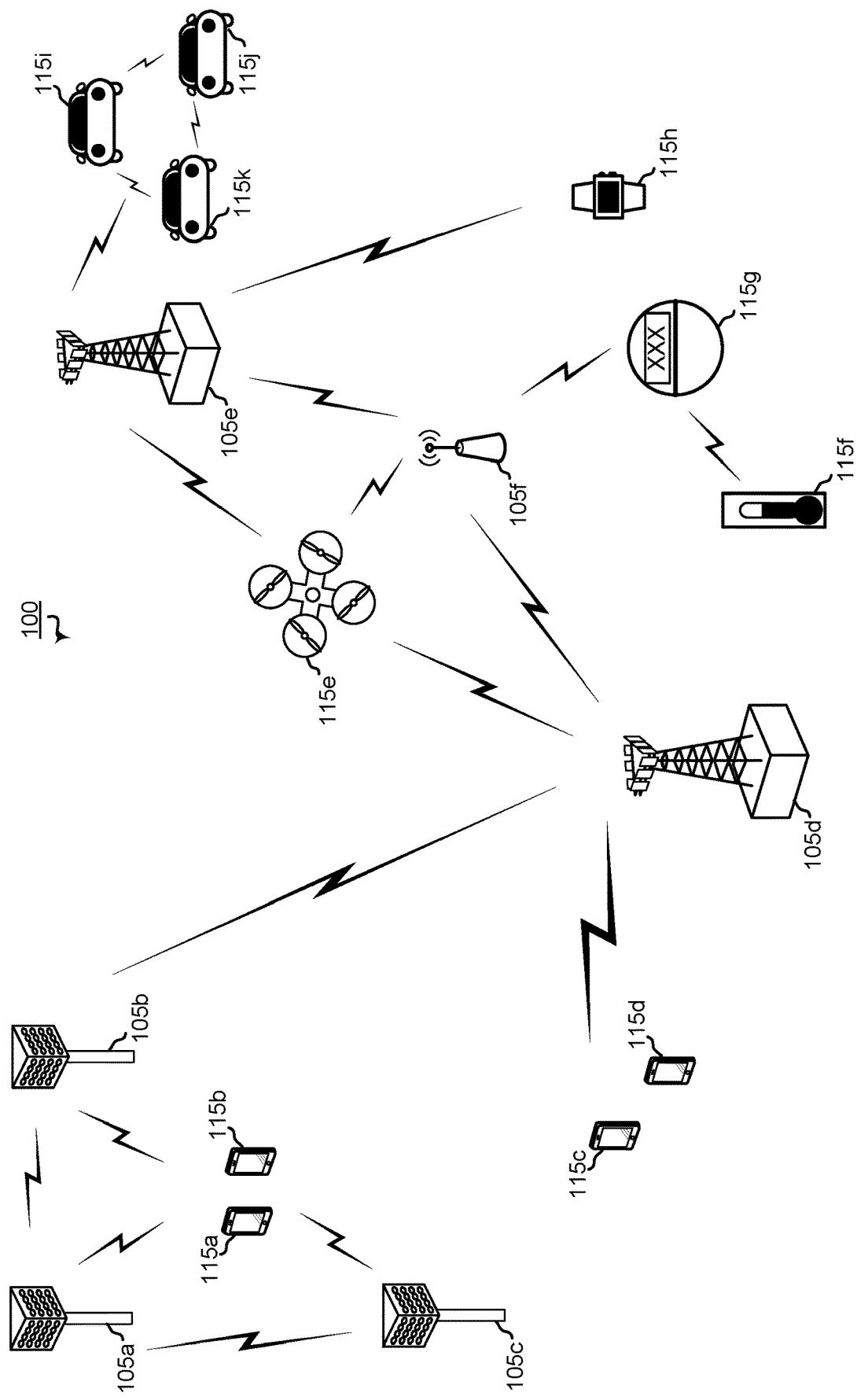
FIG. 1 is a block diagram illustrating an example of a wireless communication system that may be configured to perform demodulation reference signal (DMRS) grouping operations for full duplex communications according to some aspects of the disclosure.

A wireless communication system in accordance with some aspects of the disclosure may perform selective grouping of demodulation reference signals (DMRSs). The selective grouping may include sharing of a DMRS or bundling of DMRSs. To illustrate, DMRS bundling may include receiving signals using multiple DMRSs that are "bundled" together, and DMRS sharing may include receiving signals using a single DMRS that is "shared" among the signals.

In some aspects, DMRS grouping may be selectively performed based on full duplex resource configurations associated with resources used to transmit signals. For example, if full duplex resource configurations used to transmit signals satisfy a condition for DMRS grouping, then a transmitter device may perform a DMRS grouping operation for the signals (e.g., by bundling or sharing the one or more DMRSs among the full duplex resource configurations) and by a receiver device (e.g., by receiving the signals according to the DMRS grouping operation). If two or more full duplex resource configurations fail to satisfy the condition, then each full duplex resource configuration may receive a corresponding DMRS (where the DMRSs are not shared or bundled).

The DMRS grouping operations may be performed by a base station, by a user equipment (UE) device, or both. To illustrate, in some implementations, the transmitter device corresponds to one of a base station or a UE device, and the receiver device corresponds to the other of the base station or the UE device. The DMRS grouping operations may be performed for one or more downlink physical (PHY) channels (e.g., a physical downlink shared channel (PDSCH) or a physical downlink control channel (PDCCH)), one or more uplink PHY channels (e.g., a physical uplink shared channel (PUSCH) or a physical uplink control channel (PUCCH)), or a combination thereof.

Selectively performing DMRS grouping operations may improve performance of a wireless communication system. For example, in some circumstances, a device of the wireless communication system may selectively bundle DMRSs, which may increase quality of a channel estimation operation (e.g., by using multiple DMRSs instead of a single DMRS to determine a channel estimate), which may enhance quality of signals received based on the channel estimate. As another example, in some circumstances, the device may selectively share a DMRS, which may increase an amount of resources available for communication of other signals (such as a data signal) as compared using multiple DMRSs.

In other circumstances, DMRS grouping may be selectively avoided. For example, full duplex resource configurations may fail to satisfy a condition for DMRS grouping if DMRS grouping within the full duplex resource configurations would result in certain events, such as a reduction in phase coherency of one or more signals. To illustrate, a change in characteristics from one full duplex resource configuration to another may be associated with a change in phase of a local oscillator (LO). In this case, DMRS grouping may be selectively avoided for the full duplex resource configurations, which may increase or preserve phase coherency in some cases, such as by preserving a phase of an LO. As a result, quality of signals (or quality of reception of the signals) may be enhanced in a wireless communication system.

To further illustrate, certain aspects of the disclosure relate to communication networks, such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km^2), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~ 1 ms), and users with wide ranges of mobility or lack thereof, and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
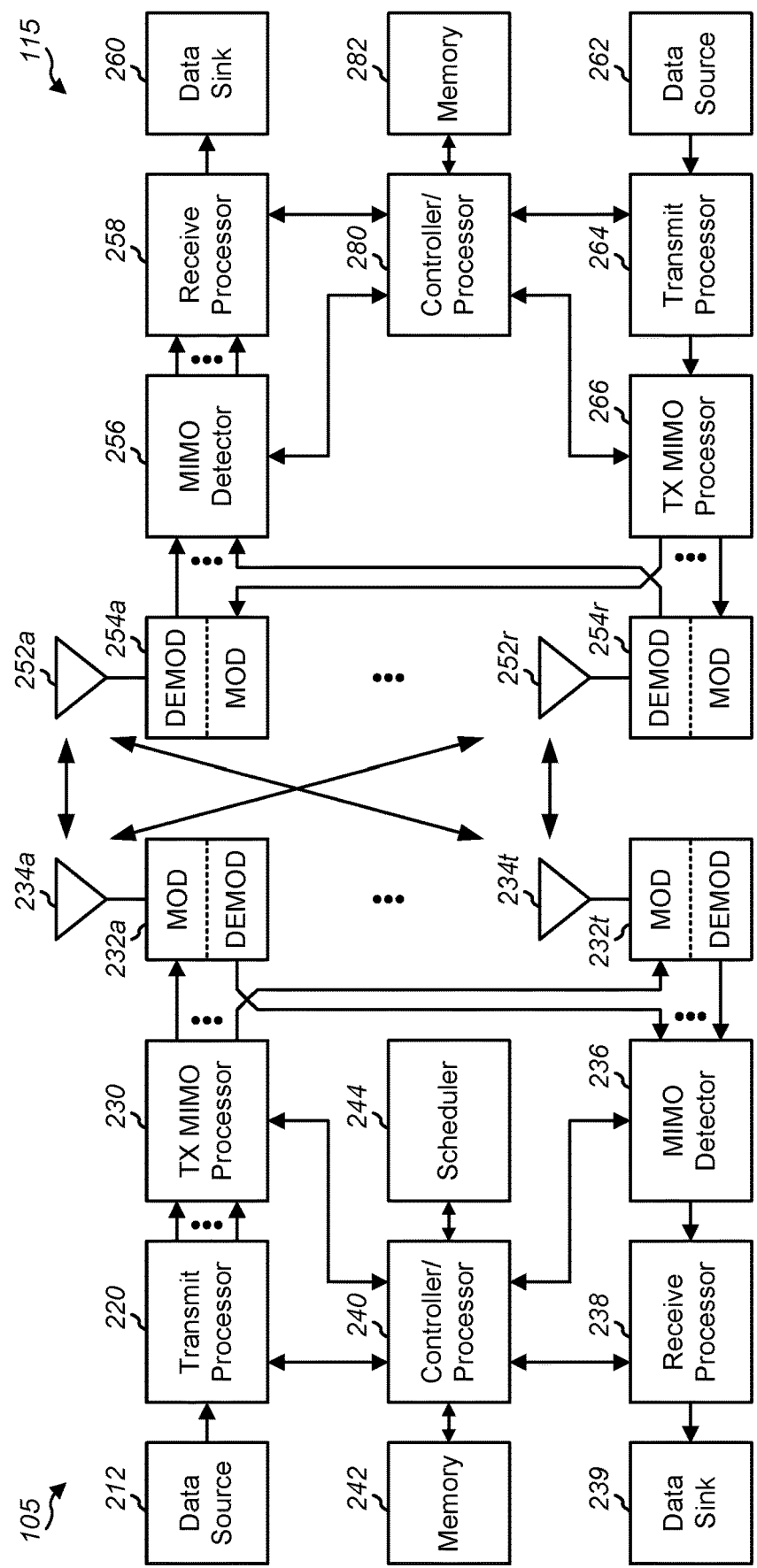
FIG. 2 is a block diagram illustrating examples of a base station and a UE that may be configured to perform DMRS grouping operations for full duplex communications according to some aspects of the disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS)

and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, the antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
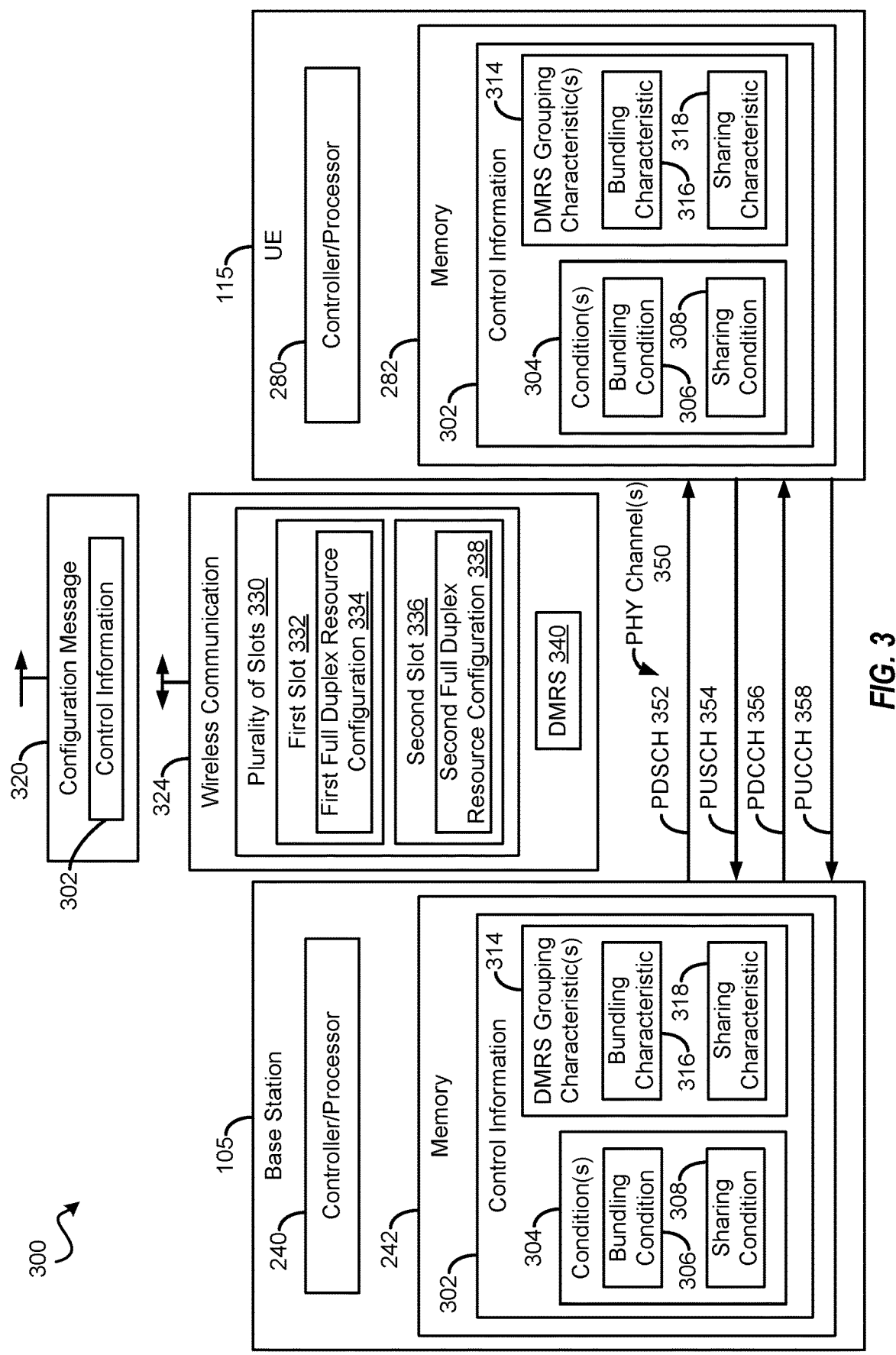
FIG. 3 is a block diagram illustrating an example of a wireless communication system that may be configured to perform DMRS grouping operations for full duplex communications according to some aspects of the disclosure.

Referring to FIG. 3, an illustrative example of a wireless communication system is depicted and generally designated 300. The wireless communication system 300 includes the base station 105 and the UE 115. Although the example of FIG. 3 illustrates a single base station 105 and a single UE 115, in other examples, the wireless communication system 300 may include multiple base stations 105, multiple UEs 115, one or more other devices, or a combination thereof.

During operation, the base station 105 and the UE 115 are configured to communicate using one or more physical (PHY) channels 350. The one or more PHY channels 350 may include one or more of a physical downlink shared channel (PDSCH) 352, a physical uplink shared channel (PUSCH) 354, a physical downlink control channel (PDCCH) 356, or a physical uplink control channel (PUCCH) 358, as illustrative examples.

In some implementations, one or both of the base station 105 and the UE 115 may receive control information 302

(e.g., via any of the one or more PHY channels 350, via one or more other channels, or a combination thereof). In one example, the base station 105 is configured to receive the control information 302 from a service provider associated with the wireless communication system 300. The base station 105 (or another base station) may be configured to provide (e.g., via a configuration message 320) the control information 302 to the UE 115. The base station 105 may be configured to store the control information 302 to the memory 242, and the UE 115 may be configured to store the control information 302 to the memory 282.

The control information 302 indicates one or more conditions 304 and one or more DMRS grouping characteristics 314 associated with the one or more conditions 304. The one or more conditions 304 may include a bundling condition 306. Alternatively or in addition, the one or more conditions 304 include a sharing condition 308. The example of FIG. 3 also illustrates that the one or more DMRS grouping characteristics 314 may include a bundling characteristic 316 associated with the bundling condition 306. Alternatively or in addition, the one or more DMRS grouping characteristics 314 may include a sharing characteristic 318 associated with the sharing condition 308.

As used herein, a DMRS grouping characteristic may refer to bundling of DMRSs, sharing of a DMRS, or both. DMRS sharing may refer to use of a DMRS that is transmitted during a first slot to receive (e.g., demodulate) a signal that is transmitted during a second slot, where a DMRS is not transmitted during the second slot (or where a DMRS that is transmitted during the second slot is not used to receive the signal that is transmitted during the second slot). DMRS bundling may refer to use of both a first DMRS that is transmitted during a first slot and a second DMRS that is transmitted during a second slot to receive (e.g., demodulate) a signal of a second slot.

To further illustrate, FIG. 3 depicts that the base station 105 and the UE 115 may perform a wireless communication 324 based on at least in part on the control information 302. The wireless communication 324 is transmitted using the one or more PHY channels 350 scheduled during a plurality of slots 330. The wireless communication 324 includes one or more DMRSs, such as a DMRS 340.

As used herein, a "slot" (e.g., any of the plurality of slots 336) may refer to any collection of consecutive orthogonal frequency-division multiplexing (OFDM) symbols that are full duplex symbols and that have any duration, one or more mini-slots, one or more frames, one or more sub-frames, or any combination thereof. In addition, a "full duplex slot" may refer to a time duration during which a downlink (e.g., the PDSCH 352, the PDCCH 356, another downlink channel, or a combination thereof) is used for communication between devices and during which an uplink (e.g., the PUSCH 354, the PUCCH 358, another uplink channel, or a combination thereof) is used for communication between devices.

Each slot of the plurality of slots 330 may be associated with a resource configuration. One example of a resource configuration is a half duplex resource configuration, where either an uplink transmission or a downlink transmission occur during a slot of the wireless communication 324. Another example of a resource configuration of a slot is a full duplex configuration. In a full duplex configuration, an uplink transmission and a downlink transmission may occur simultaneously during a slot. In the example of FIG. 3, the plurality of slots 330 includes a first slot 332 having a first full duplex resource configuration 334 and further includes a second slot 336 having a second full duplex resource configuration 338.

In some examples, the bundling characteristic 316 indicates DMRS bundling is enabled during slots with full duplex resource configurations that satisfy the bundling condition 306. In some other examples, the bundling characteristic 316 indicates DMRS bundling is disabled during slots with full duplex resource configurations that satisfy the bundling condition 306. Further, in some examples, the sharing characteristic 318 indicates DMRS sharing is enabled during slots with full duplex resource configurations that satisfy the sharing condition 308. In some other examples, the sharing characteristic 318 indicates DMRS sharing is disabled during slots with full duplex resource configurations that satisfy the sharing condition 308.

Figure 4:
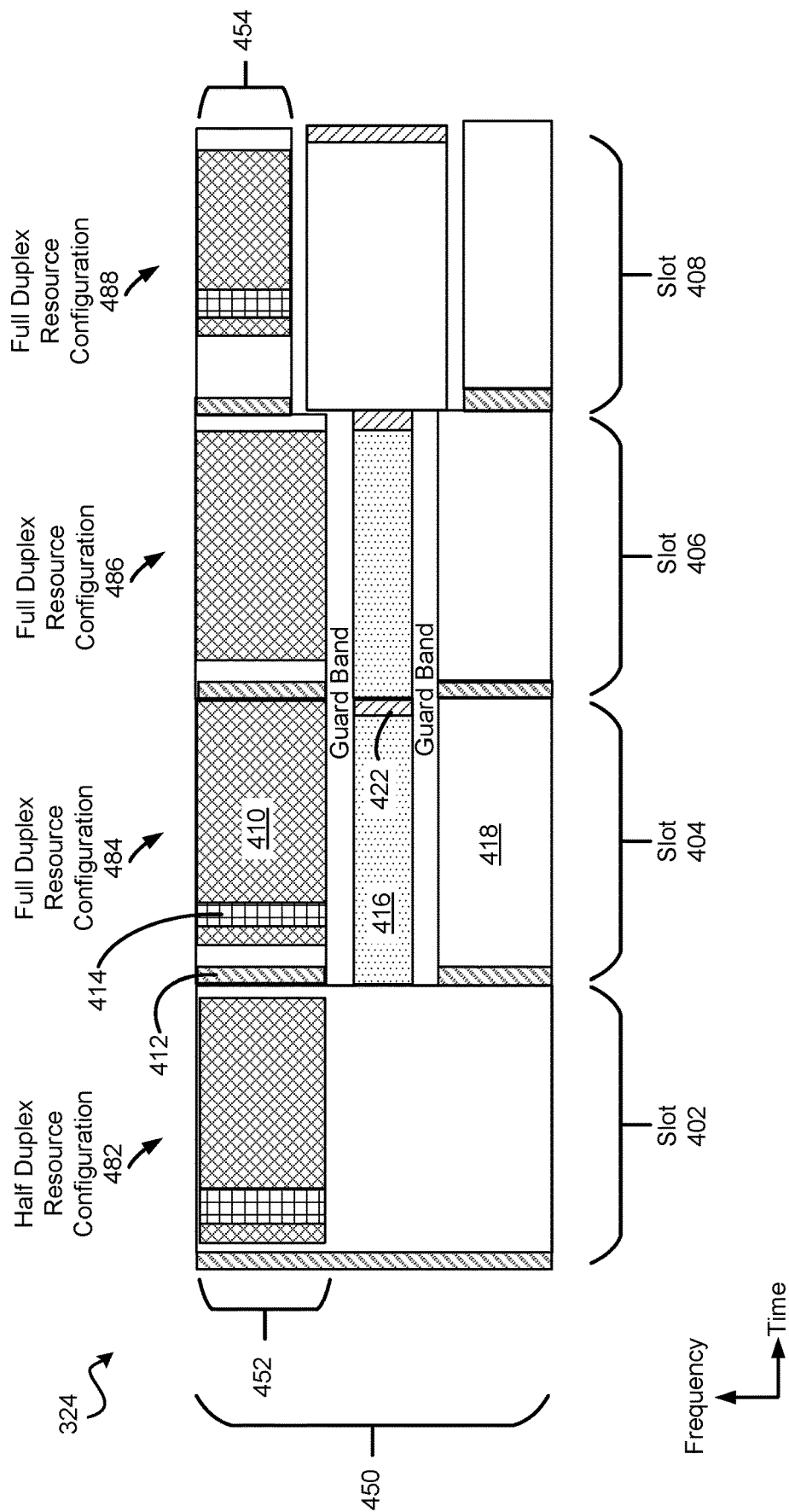
FIG. 4 is a block diagram illustrating an example of a wireless communication that may be communicated using a wireless communication system, such as the wireless communication system of FIG. 3.

To further illustrate, FIG. 4 depicts an illustrative example of the wireless communication 324. In FIG. 4, the wireless communication 324 is transmitted during multiple slots. To illustrate, in FIG. 4, the wireless communication 324 is transmitted during slots 402, 404, 406, and 408. In some implementations, the plurality of slots 330 of FIG. 3 includes the slots 402, 404, 406, and 408.

Each slot 402, 404, 406, and 408 is associated with a corresponding resource configuration, such as a type or number of channels (e.g., the one or more PHY channels 350) scheduled for use during the slot and a type of transmission (e.g., uplink or downlink) that is performed using the channels. To illustrate, the slot 402 may be associated with a half duplex resource configuration 482. The slots 404, 406, and 408 may be associated with full duplex resource configurations 484, 486, and 488, respectively.

In some examples, a resource configuration may change dynamically during operation of the wireless communication system 300 of FIG. 3. For example, a slot (such as the slot 402) may be "converted" from a full-duplex configuration to a half-duplex configuration in response to resource availability in the wireless communication system 300.

In the example of FIG. 4, each slot 402, 404, 406, and 408 may be associated with a downlink portion, such as a representative downlink portion 410 of the slot 404. In some examples, the downlink portion 410 includes data of a physical downlink shared channel (PDSCH). Further, the slots 404, 406, and 408 may each include an uplink portion, such as a representative uplink portion 416 of the slot 404. In some examples, the uplink portion 416 includes data of a physical uplink shared channel (PUSCH). In the example of FIG. 4, the slots 404, 406, and 408 include additional downlink portions, such as a representative downlink portion 418 of the slot 404. In some examples, the downlink portion 418 includes data of a PDSCH.

In some implementations, a guard band may be used to separate uplink and downlink portions of the wireless communication 324. For example, FIG. 4 illustrates that a guard band may separate uplink and downlink portions of the slots 404, 406, and 408.

In some examples, the wireless communication 324 includes control information. For example, downlink portions of the wireless communication 324 may include downlink control information, such as representative downlink control information 412 of the slot 404. In some implementations, uplink portions of the wireless communication 324 may include uplink control information, such as representative uplink control information 422 of the slot 404.

In the example of FIG. 4, each resource configuration 482, 484, 486, and 484 may be associated with an available bandwidth 450. The available bandwidth 450 may correspond to an amount of bandwidth that is scheduled for communication during a slot. In some cases, the actual amount of bandwidth used for communication during a slot may differ from (e.g., may be less than) the available bandwidth 450. The actual amount of bandwidth used may be referred to herein as resource bandwidth. For example, an actual bandwidth 452 (e.g., resource bandwidth) used for a downlink portion of the wireless communication 324 (e.g., the downlink portion 410) may be less than the available bandwidth 450.

In the example of FIG. 4, downlink portions of the resource configurations 482, 484, 486, and 484 may have a common actual bandwidth (the actual bandwidth 452). In FIG. 4, an actual bandwidth 454 of the downlink portion of the resource configuration 488 is less than the actual bandwidth 452 of the downlink portions of the resource configurations 482, 484, and 486 (e.g., due to resource availability or other criteria).

One or more of the resource configurations 482, 484, 486, and 484 may include a DMRS. For example, the downlink portion 410 may include a DMRS 414, such as the DMRS 340 of FIG. 3. In some examples, each slot of the wireless communication 324 includes or excludes a DMRS based on the control information 302 of FIG. 3.

In accordance with some aspects of the disclosure, the one or more conditions 304 of FIG. 3 specify that a first bandwidth of a first portion of first full duplex resource configuration corresponds to a second bandwidth of a second portion of a second slot. For example, the bundling condition 306 may specify that bundling is enabled (or permitted) for two or more slots of the wireless communication 324 that have a common actual bandwidth. Alternatively or in addition, the sharing condition 308 may specify that sharing is enabled (or permitted) for two or more slots of the wireless communication 324 that have a common actual bandwidth.

To further illustrate, in some examples, the resource configurations 484, 486 satisfy the bundling condition 306 and the sharing condition 308 due to having downlink portions with a common actual bandwidth 452. Thus, in some examples, the resource configurations 484, 486 may share a common DMRS or may include bundled DMRSs. In the example of FIG. 4, the downlink portion of the slot 406 does not include a DMRS and may share the DMRS 414 with the downlink portion of the slot 404.

Further, in some examples, the resource configuration 488 fails to satisfy the bundling condition 306 and the sharing condition 308 due to the actual bandwidth 454 differing from the common actual bandwidth 452. In this case, the slot 408 may include a DMRS that is not shared or bundled with the slots 404, 406.

In some implementations, a half duplex resource configuration may be excluded from sharing, bundling, or both, with slots. For example, in some implementations, the half duplex resource configuration 482 is excluded from bundling, sharing, or both. In this case, the downlink portion of the resource configuration 482 may include a DMRS that is not shared or bundled with downlink portions of the resource configurations 484, 486, and 488.

Figure 5:
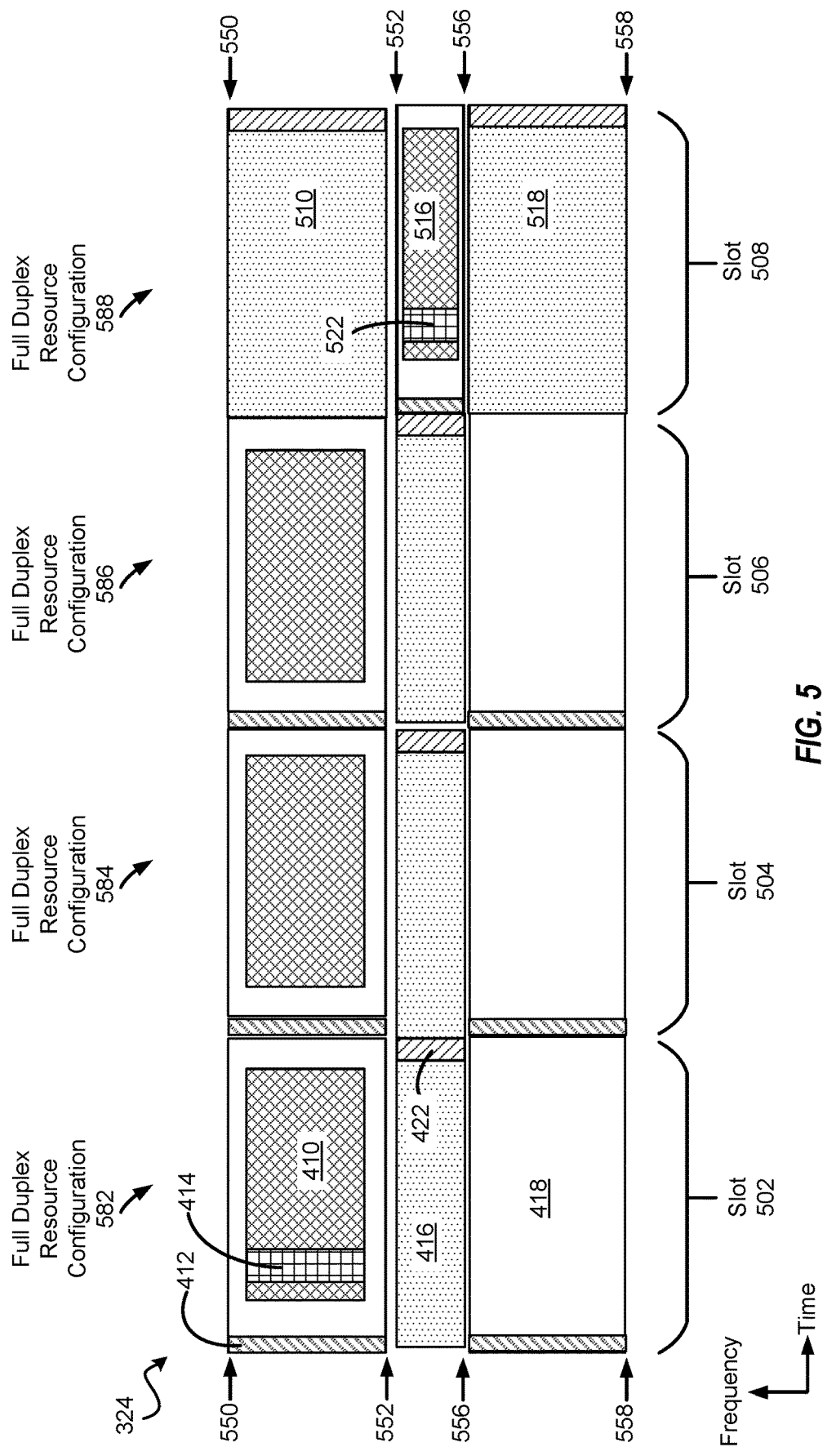
FIG. 5 is a block diagram illustrating another example of a wireless communication that may be communicated using a wireless communication system, such as the wireless communication system of FIG. 3.

FIG. 5 depicts another example of the wireless communication 324. In FIG. 5, the wireless communication 324 is transmitted during slots 502, 504, 506, and 508. The slots 502, 504, 506, and 508 are associated with full duplex resource configurations 582, 584, 586, and 588, respectively. In some implementations, the plurality of slots 330 of FIG. 3 includes the slots 502, 504, 506, and 508.

In some examples, one or more features of wireless communication 324 of FIG. 5 are as described with reference to FIG. 4. For example, each of the slots 502, 504, 506, and 508 may be used to communicate one or more downlink portions (e.g., the downlink portions 410, 418), one or more uplink portions (e.g., the uplink portion 416), downlink control information (e.g., the downlink control information 412), and uplink control information (e.g., the uplink control information 422).

To further illustrate, the slot 508 may be used to communicate uplink portions 510 and 518 and a downlink portion 516. In FIG. 5, the downlink portion 516 includes a DMRS 522.

In FIG. 5, downlink portions of the resource configurations 582, 584, 586, and 588 are associated with a frequency boundary 550 (e.g., an upper frequency boundary of the downlink portions) and with a frequency boundary 552 (e.g., a lower frequency boundary of the downlink portions). The downlink portion 516 is associated with a frequency boundary 552 (e.g., an upper frequency boundary of the downlink portion 516) and with a frequency boundary 556 (e.g., a lower frequency boundary of the downlink portion 516).

In accordance with some aspects of the disclosure, the one or more conditions 304 of FIG. 3 specify that first frequency boundaries of uplink and downlink portions of a first full duplex resource configuration correspond to second frequency boundaries of uplink and downlink portions of a second full duplex resource configuration. For example, the bundling condition 306 may specify that bundling is enabled (or permitted) for two or more resource configurations of the wireless communication 324 that have common frequency boundaries for both uplink portions and downlink portions. Alternatively or in addition, the sharing condition 308 may specify that sharing is enabled (or permitted) for two or more resource configurations of the wireless communication 324 that have common frequency boundaries for both uplink portions and downlink portions.

To further illustrate, in some examples, the resource configurations 582, 584, and 586 satisfy the bundling condition 306 and the sharing condition 308 due to uplink and downlink portions having common frequency boundaries. For example, in FIG. 5, downlink portions of the resource configurations 582, 584, and 586 have common frequency boundaries 550, 552 and common frequency boundaries 556, 558. As another example, in FIG. 5, uplink portions of the resource configurations 582, 584, and 586 have common frequency boundaries 552, 556. Thus, in some examples, resource configurations 582, 584, and 586 may share a common DMRS or may include bundled DMRSs. In the example of FIG. 4, the downlink portions of the resource configurations 584 and 586 do not include a DMRS and may share the DMRS 414 with the resource configuration 582.

Further, in some examples, the resource configuration 588 fails to satisfy the bundling condition 306 and the sharing condition 308 due to having downlink frequency boundaries that differ from downlink frequency boundaries of the resource configurations 582, 584, and 586, due to having uplink frequency boundaries that differ from uplink frequency boundaries of the resource configurations 582, 584, and 586, or both. To illustrate, in FIG. 5, the downlink portion 516 has frequency boundaries 552, 556 that differ from the frequency boundaries 550, 552 and 556, 558 of downlink portions of the resource configurations 582, 584, and 586. As another example, in FIG. 5, the uplink portions 510, 518 have frequency boundaries 550, 552 and 556, 558 that differ from the frequency boundaries 552, 556 of uplink portions of the resource configurations 582, 584, and 586.

Accordingly, the resource configuration 588 may include a DMRS 522 that is not shared or bundled with the resource configurations 582, 584, and 586.

Figure 6:
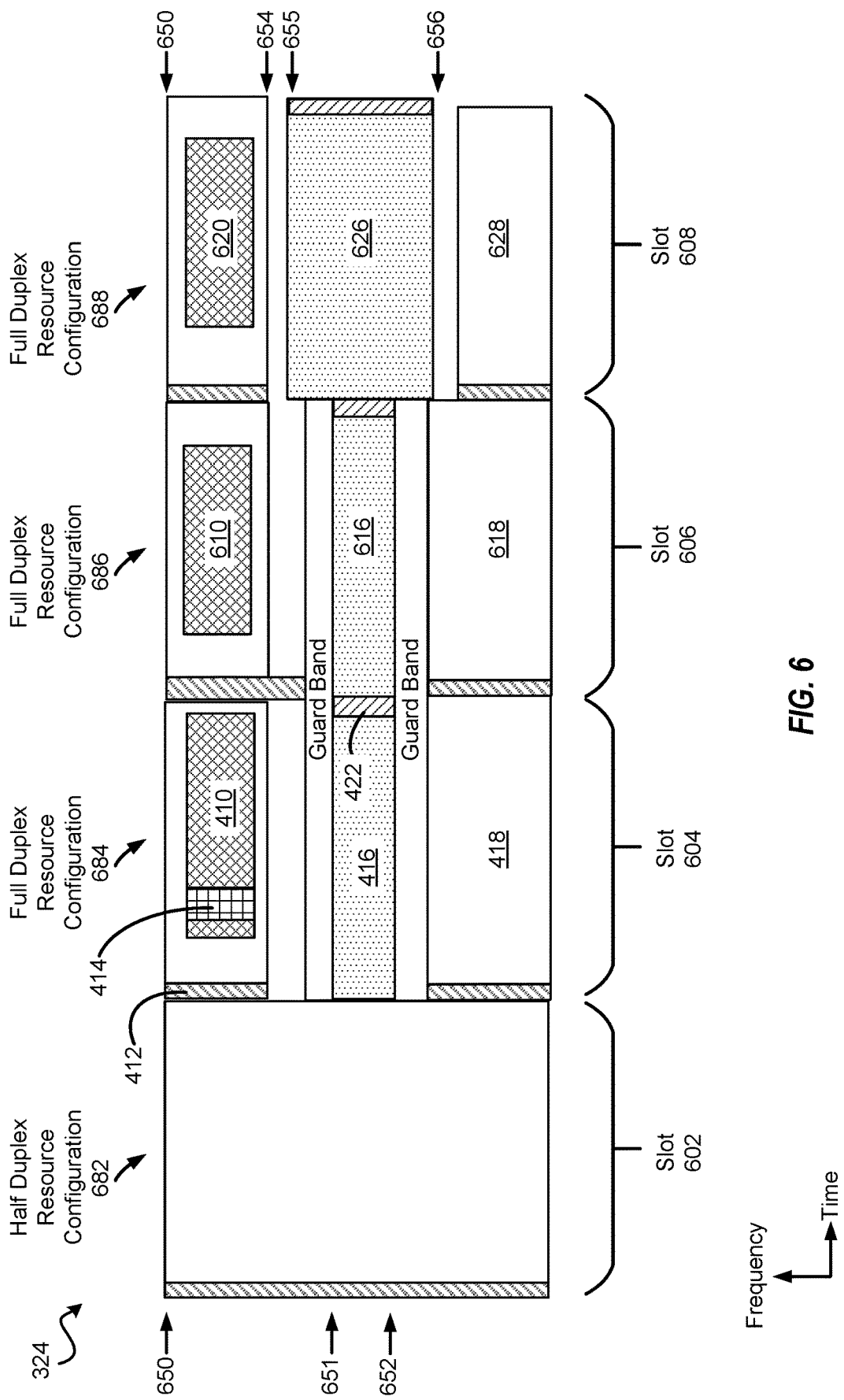
FIG. 6 is a block diagram illustrating another example of a wireless communication that may be communicated using a wireless communication system, such as the wireless communication system of FIG. 3.

FIG. 6 depicts another example of the wireless communication 324. In FIG. 6, the wireless communication 324 occurs during slots 602, 604, 606, and 608. The slots 602, 604, 606, and 608 are associated with full duplex resource configurations 682, 684, 686, and 688, respectively. In some implementations, the plurality of slots 330 of FIG. 3 includes the slots 602, 604, 606, and 608.

In some examples, one or more features of wireless communication 324 of FIG. 5 are as described with reference to FIG. 4. For example, each of the slots 602, 604, 606, and 608 may be used to communicate one or more downlink portions (e.g., the downlink portions 410, 418), one or more uplink portions (e.g., the uplink portion 416), downlink control information (e.g., the downlink control information 412), and uplink control information (e.g., the uplink control information 422).

To further illustrate, the slot 606 may be used to communicate downlink portions 610 and 618 and an uplink portion 616. The slot 608 may be used to communicate downlink portions 620, 628 and an uplink portion 626.

In accordance with some aspects of the disclosure, the one or more conditions 304 of FIG. 3 specify that first frequency boundaries of a first uplink or downlink portion of a first full duplex resource configuration correspond to second frequency boundaries of a second uplink or downlink portion of a second full duplex resource configuration. In this example, sharing or bundling may be enabled for uplink portions of the wireless communication 324 having common frequency boundaries (irrespective of whether corresponding downlink portions of the wireless communication 324 have different frequency boundaries than one another). Alternatively or in addition, sharing or bundling may be enabled for downlink portions of the wireless communication 324 having common frequency boundaries (irrespective of whether corresponding uplink portions of the wireless communication 324 have different frequency boundaries than one another).

To illustrate, in FIG. 6, the downlink portions 410, 610, and 620 have common frequency boundaries 650, 654. FIG. 6 also illustrates that the uplink portions 416, 616 have frequency boundaries 651, 652 and that the uplink portion 626 has frequency boundaries 655, 656 that are different than the frequency boundaries 651, 652. Accordingly, in some aspects of the disclosure, the control information 302 indicates that the downlink portions 410, 610, and 620 are eligible for sharing with one another, bundling with one another, or both, and further indicates that the uplink portions 416, 616 are eligible for sharing with one another, bundling with one another, or both. In FIG. 6, the DMRS 414 may be shared among the downlink portions 410, 610, and 620.

The control information 302 may indicate that the uplink portion 626 is ineligible for sharing, bundling, or both with respect to the uplink portions 416, 616 of the slots 604, 606. Further, the control information 302 may indicate that the downlink portions 618, 418 are eligible for sharing with one another, bundling with one another, or both, and that the downlink portion 628 is ineligible for sharing with the downlink portions 418, 618, for bundling with the downlink portions 418, 618, or both.

Figure 7:
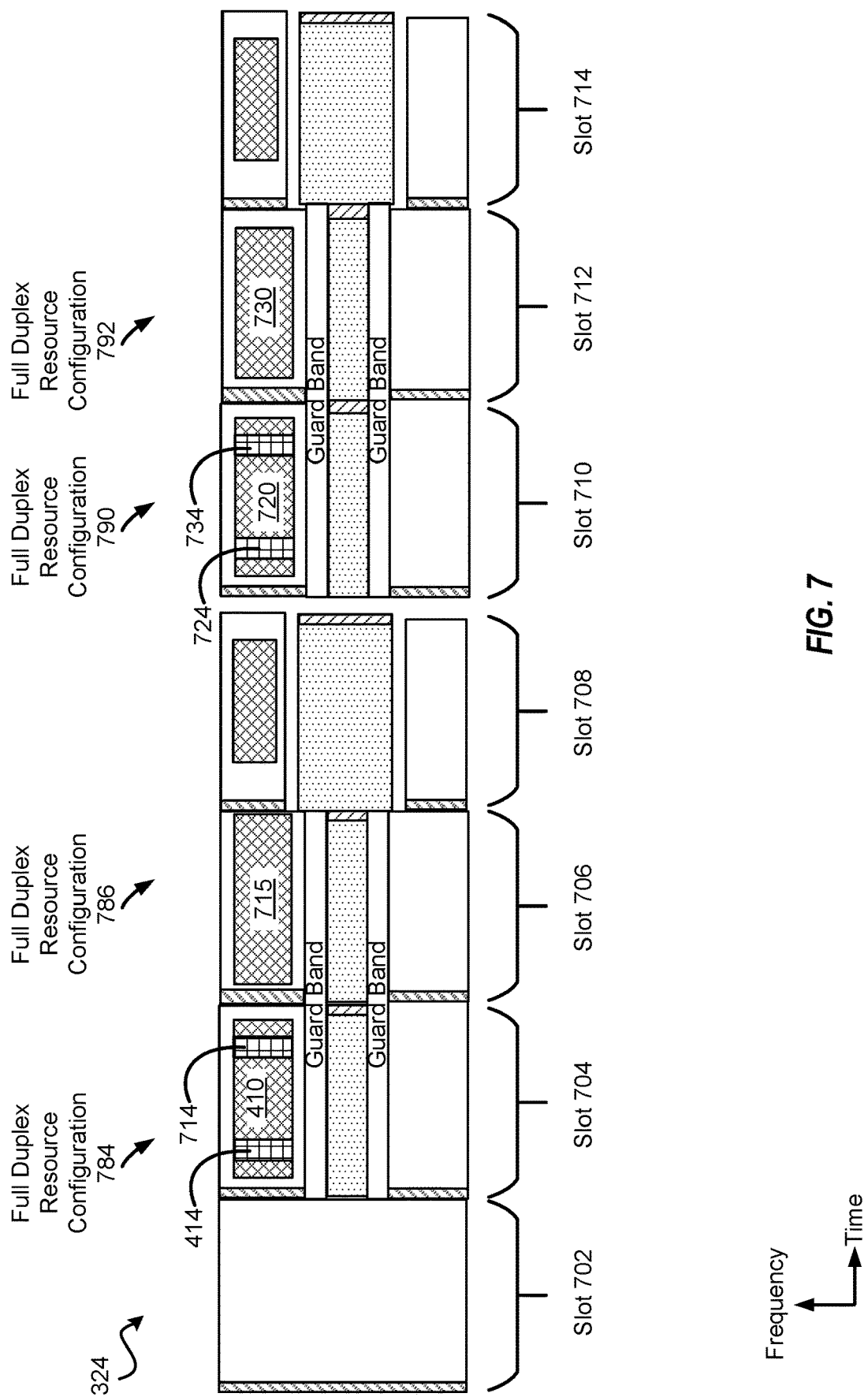
FIG. 7 is a block diagram illustrating another example of a wireless communication that may be communicated using a wireless communication system, such as the wireless communication system of FIG. 3.

FIG. 7 depicts another example of the wireless communication 324. In the example of FIG. 7, the wireless communication 324 occurs during slots 702, 704, 706, 708, 710, 712, and 714. The slots 704, 706, 710, and 712 may include downlink portions 410, 715, 720, and 730, respectively. The slots 704, 706, 710, and 712 may be associated with full duplex resource configurations 784, 786, 790, and 792, respectively. In some implementations, the plurality of slots 330 of FIG. 3 includes the slots 702, 704, 706, 708, 710, 712, and 714.

In some aspects of the disclosure, the one or more conditions 304 of FIG. 3 specify that a first slot is adjacent in time to a second slot. In this example, slots adjacent in time may be eligible for sharing, for bundling, or both, and slots non-adjacent in time may be ineligible for sharing, for bundling, or both.

To illustrate, in FIG. 7, the slot 704 is adjacent in time to the slot 706. Accordingly, in some aspects of the disclosure, the downlink portion 410 is eligible for sharing with the downlink portion 715, for bundling with the downlink portion 715, or both. In the example of FIG. 7, the DMRS 414 may be shared among the downlink portions 410, 715. Alternatively or in addition, the downlink portion 410 may include a DMRS 714 that is shared among the downlink portions 410, 715.

As another example, in FIG. 7, the slot 710 is adjacent in time to the slot 712. Accordingly, in some aspects of the disclosure, the downlink portion 720 is eligible for sharing with the downlink portion 730, for bundling with the downlink portion 730, or both. In the example of FIG. 7, the downlink portion 720 may include a DMRS 724 that is shared among the downlink portions 720, 730. Alternatively or in addition, the downlink portion 720 may include a DMRS 734 that is shared among the downlink portions 720, 730.

To further illustrate, the slots 706, 710 are non-adjacent in time (e.g., due to the slot 708 occurring in between the slots 706, 710). As a result, in some examples, the downlink portions 715, 720 are ineligible for sharing, for bundling, or both.

Further, although certain conditions are described separately herein for convenience, it should be appreciated that two or more conditions described herein may be combined. In one example, the one or more conditions 304 may specify a condition of FIG. 4 in conjunction with one or more conditions of FIG. 4, in conjunction with one or more conditions of FIG. 5, in conjunction with one or more conditions of FIG. 6, or a combination thereof.

Figure 8:
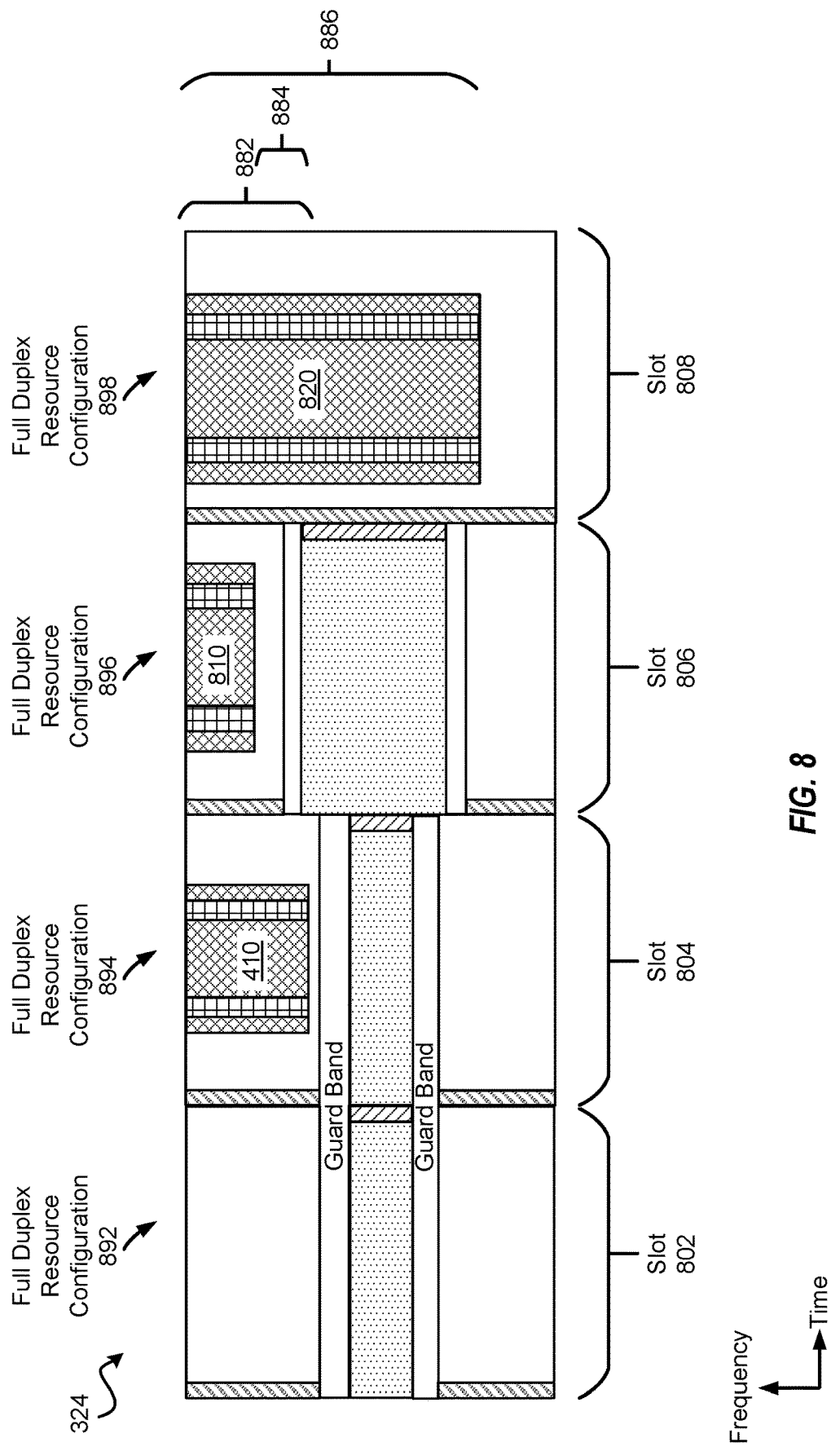
FIG. 8 is a block diagram illustrating another example of a wireless communication that may be communicated using a wireless communication system, such as the wireless communication system of FIG. 3.

FIG. 8 depicts another example of the wireless communication 324. In the example of FIG. 8, the wireless communication 324 includes slots 802, 804, 806, and 808. The slots 802, 804, 806, and 808 are associated with full duplex resource configurations 892, 894, 896, and 898, respectively. The slots 804, 806, and 808 may include downlink portions 410, 810, and 820, respectively. In some implementations, the plurality of slots 330 of FIG. 3 includes the slots 802, 804, 806, and 808.

In the example of FIG. 8, each downlink portion 410, 810, and 820 may have a different actual bandwidth than the other downlink portions 410, 810, and 820. For example, the downlink portion 410 may have an actual bandwidth 882. The downlink portion 810 may have an actual bandwidth 882 that is different than (e.g., less than) the actual bandwidth 884. The downlink portion 820 may have an actual bandwidth that is different than (e.g., greater than) the actual bandwidth 882 and the actual bandwidth 884.

In accordance with some aspects of the disclosure, the one or more conditions 304 of FIG. 3 specify one or more criteria among slots associated with resource configurations having different actual bandwidths, such as the actual bandwidths 882, 884, and 886. In a first example in accordance with FIG. 8, the one or more conditions 304 of FIG. 3 specify that a first bandwidth of a first downlink portion of a first full duplex resource configuration is greater than or equal to a second bandwidth of a second downlink portion of a second full duplex resource configuration and further specify that the second bandwidth is greater than or equal to a third bandwidth of a third downlink portion of a third full duplex resource configuration. In the first example, downlink portions may be eligible for sharing or bundling if the actual bandwidths of downlink portions do not increase from one slot to a subsequent slot.

To illustrate, in accordance with the first example, the downlink portion 810 may be eligible for bundling or sharing with the downlink portion 410 because the actual bandwidth 882 is greater than or equal to the actual bandwidth 884. In accordance with the first example, the downlink portion 820 may be ineligible for sharing with the downlink portions 410, 410 because the actual bandwidth 886 is greater than the actual bandwidth 884 of the slot 806.

In a second example in accordance with FIG. 8, the one or more conditions 304 of FIG. 3 specify that a first downlink portion of a first full duplex resource configuration is greater than or equal to a second bandwidth of a second downlink portion of a second full duplex resource configuration and further specify that the first bandwidth is greater than or equal to a third bandwidth of a third downlink portion of a third full duplex resource configuration. In the second example, downlink portions may be eligible for sharing or bundling if an initial slot of the set has a downlink portion with an actual bandwidth that is greater than the actual bandwidths of the subsequent slots of the set.

To illustrate, in accordance with the second example, the downlink portions 410, 810, and 820 may be ineligible for sharing or bundling because the actual bandwidth 882 of the downlink portion 410 is not greater than or equal to the actual bandwidth 886 of the downlink portion 820. In another implementation of the second example, the downlink portion 810 may be eligible for sharing or bundling with the downlink portion 410 (because the actual bandwidth 884 is less than the actual bandwidth 884), and the downlink portion 820 may be ineligible for sharing or bundling with the downlink portions 410, 810 (because the actual bandwidth 886 is greater than the actual bandwidths 882, 884).

In a third example in accordance with FIG. 8, the one or more conditions 304 of FIG. 3 specify that a first bandwidth of a first downlink portion of a first full duplex resource configuration corresponds to a second bandwidth of a second downlink portion of a second full duplex resource configuration and that the first bandwidth corresponds to a third bandwidth of a third downlink portion of a third full duplex resource configuration of the wireless communication. In the third example, downlink portions of a set of slots may be eligible for sharing or bundling if the slots have a common actual bandwidth.

To illustrate, in the example of FIG. 8, none of the downlink portions 410, 810, and 820 have a common actual bandwidth. As a result, the downlink portions 410, 810, and 820 may be ineligible for sharing, for bundling, or both. In some other examples, the downlink portions 410, 810, and 820 may have a common actual bandwidth and may be eligible for sharing, for bundling, or both.

Although certain examples of FIGS. 4-8 have been described with reference to downlink operations, such operations can be performed in connection with uplink operations (alternatively or in addition to downlink operations). For example, bundling and sharing operations described herein can be performed in connection with PDSCH communications, PUSCH communications, PUCCH communications, PDCCH communications, other communications, or a combination thereof.

To further illustrate, in some aspects of the disclosure, an example of full duplex communication is sub-band frequency division duplex (SBFDD) communication, which may also be referred to as a flexible duplex communication technique. SBFDD communication may involve simultaneously transmitting and receiving signals using different frequency resources (e.g., where downlink resources are separated from uplink resources, such as via guard band). Another example of full duplex communication is in-band full duplex (IBFD) communication, which may involve simultaneously transmitting and receiving signals using common time and frequency resources (e.g., where time resources partially or fully overlap frequency resources).

In some implementations, SBFDD communication may be performed using a component carrier bandwidth (CC BW). For example, each wireless communication 324 illustrated with reference to FIGS. 4-8 may correspond to an SBFDD wireless communication having a frequency range (illustrated as the vertical axis) corresponding to a CC BW. In some implementations, the CC BW has an uplink bandwidth part (BWP) of 20 MHz and a downlink BWP of 80 MHz. In other implementations, different partitions of bandwidth may be used (e.g., depending on interference between base stations and other devices, as an illustrative example).

Within an active BWP, different resource bandwidths (BWs) may be defined and may be dynamically assigned or indicated. In some examples, a resource BW is indicated using downlink control information (DCI). Alternatively or in addition, resource BWs can be radio resource control (RRC) configured. Depending on the example, resource BWs can be contiguous or disjoint. In some cases, frequency domain resource assignment (FDRA) may be performed per resource bandwidth and may use fewer bits as compared to a BWP. In some cases, an uplink and a downlink may have different resource BW configurations. Further, each resource BW may be associated with a respective configuration, such as a resource block group (RBG). Uplink and downlink resource BWs may be non-overlapping (such as in connection with an SBFDD communication) or partially overlapping (such as in connection with an IBFD communication). In some examples, "zero delay" switching between resource BWs may be implemented.

In some aspects of the disclosure, one or more of DMRS sharing or DMRS bundling may be performed in a full duplex system across transmissions (or repetitions of the same transmission) subject to one or more conditions. The conditions may specify that two or more of a PDSCH, a PUSCH, a PDCCH, and a PUCCH (hereinafter, "PxyCHs") use DMRS sharing or bundling. In a first example, the conditions may further specify that the PxyCHs are to be transmitted on full duplex (FD) slots having the same resource BW of the same active BWP. In a variation of the first example, in the case of multiple resource BWs, then the conditions may further specify that the downlink and uplink frequency domain portions of the resource BWs are to be the same. In a second example, the conditions may further specify that the PxyCHs are to be transmitted on slots having the same downlink (or uplink) frequency domain boundaries (while allowing change in the uplink (or downlink) frequency domain boundaries among the PxyCHs). In a third option, the conditions further specify that the PxyCHs comply with the conditions of the first example, the second example, or both, and also specify that the PxyCHs are adjacent to one another (e.g., without a slot in between the PxyCHs that may have different downlink boundaries, uplink boundaries, or both). In some implementations, the first example corresponds to the example of FIG. 4, the variation of the first example corresponds to the example of FIG. 5, the second example corresponds to the example of FIG. 6, and the third example corresponds to the example of FIG. 7.

In some examples, the conditions enable the UE to maintain phase coherency across the PxyCHs. Further, the UE 115 may operate based on, or may select operation based on, any of the foregoing examples, which may be referred to as a capability of the UE 115. The UE 115 may report the capability (e.g., to the base station 105) per downlink channel, per uplink channel, or both. The UE 115 may report the capability (e.g., to the base station 105) per each physical (PHY) channel, such as if the UE 115 has one capability per PDSCH and another capability per PUSCH. As a non-limiting example, the UE 115 may operate according to one example with respect to a PDSCH and may operate according to another example with respect to a PUSCH. The UE 115 may report the capability (e.g., to the base station 105) per band, per frequency range, or both.

In some implementations, the base station 105 may configure the UE 115 with one or more of the capabilities. For example, the base station 105 may send the UE 115 an indication of one or more of the capabilities in a DMRS sharing or bundling configuration message.

In some examples, the base station 105 and the UE 115 operate based on a wireless communication protocol that specifies one or more features (e.g., "constraints") associated with the capabilities. For example, the wireless communication protocol may specify that the UE 115 is expected to bundle PxyCHs if the conditions of the first example, the second example, or the third example are satisfied. Alternatively or in addition, the wireless communication protocol may specify that the UE 115 optionally may (or may not) bundle PxyCHs if the conditions of the first example, the second example, or the third example are satisfied.

Figure 9:
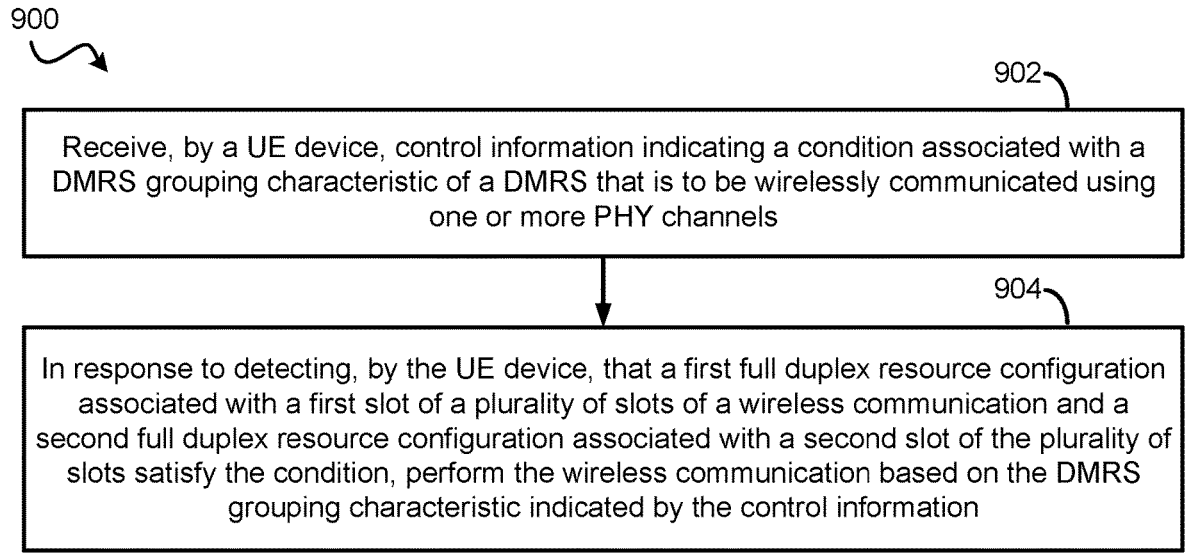
FIG. 9 is a flow chart of a method of operation of a UE in accordance with some aspects of the disclosure.

Referring to FIG. 9, an illustrative example of a method is depicted and generally designated 900. In some examples, operations of the method 900 are performed by a UE device, such as the UE 115.

The method 900 includes receiving, by a UE device, control information indicating a condition associated with a DMRS grouping characteristic of a DMRS that is to be wirelessly communicated using one or more PHY channels, at 902. For example, the UE 115 may receive the control information 302 indicating the one or more conditions 304 and the one or more DMRS grouping characteristics 314. In some examples, the one or more PHY channels 350 include one or more of the PDSCH 352, the PUSCH 354, the PDCCH 356, or the PUCCH 358. In some examples, the DMRS corresponds to any of the any of the DMRSs 340, 414, 522, 714, 724, or 734.

The method 900 further includes, in response to detecting, by the UE device, that a first full duplex resource configuration associated with a first slot of a plurality of slots of a wireless communication and a second full duplex resource configuration associated with a second slot of the plurality of slots satisfy the condition, performing the wireless communication based on the DMRS grouping characteristic indicated by the control information, at 904. In some examples, the first slot corresponds to one of the slots 332, 336, 404-408, 502-508, 604-608, 704-714, and 804-808, and the second slot corresponds to another of the slots 332, 336, 404-408, 502-508, 604-608, 704-714, and 804-808. In some examples, the first full duplex resource configuration corresponds to one of the full duplex resource configurations 334, 338, 484-488, 582-588, 684-688, 784-792, and 892-898, and the second full duplex resource configuration corresponds to another of the full duplex resource configurations 334, 338, 484-488, 582-588, 684-688, 784-792, and 892-898.

In some examples, the wireless communication corresponds to the wireless communication 324. To further illustrate, in some examples, performing the wireless communication includes sending, to a base station, the DMRS based on the DMRS grouping characteristic. For example, the UE 115 may send, to the base station 105, any of the DMRSs 414, 522, 714, 724, or 734 based on the one or more DMRS grouping characteristics 314. In another example, performing the wireless communication includes receiving, from a base station, the DMRS based on the DMRS grouping characteristic. For example, the UE 115 may receive, from the base station 105, any of the DMRSs 414, 522, 714, 724, or 734 based on the one or more DMRS grouping characteristics 314.

Figure 10:
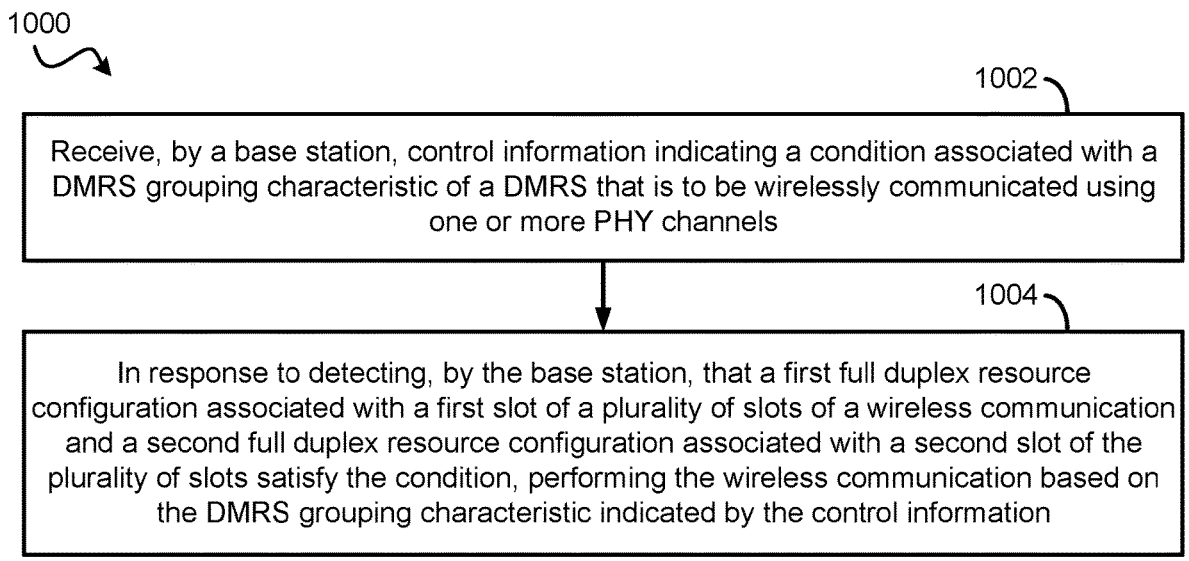
FIG. 10 is a flow chart of a method of operation of a base station in accordance with some aspects of the disclosure.

Referring to FIG. 10, an illustrative example of a method is depicted and generally designated 1000. In some examples, operations of the method 1000 are performed by a base station device, such as the base station 105.

The method 1000 includes receiving, by a base station, control information indicating a condition associated with a DMRS grouping characteristic of a DMRS that is to be wirelessly communicated using one or more PHY channels, at 1002. For example, the base station 105 may receive the control information 302 indicating the one or more conditions 304 and the one or more DMRS grouping characteristics 314. In some examples, the one or more PHY channels 350 include one or more of the PDSCH 352, the PUSCH 354, the PDCCH 356, or the PUCCH 358. In some examples, the DMRS corresponds to any of the any of the DMRSs 340, 414, 522, 714, 724, or 734.

The method 1000 further includes, in response to detecting, by the base station, that a first full duplex resource configuration associated with a first slot of a plurality of slots of a wireless communication and a second full duplex resource configuration associated with a second slot of the plurality of slots satisfy the condition, performing the wireless communication based on the DMRS grouping characteristic indicated by the control information, at 1004. In some examples, the first slot corresponds to one of the slots 332, 336, 404-408, 502-508, 604-608, 704-714, and 804-808, and the second slot corresponds to another of the slots 332, 336, 404-408, 502-508, 604-608, 704-714, and 804-808. In some examples, the first full duplex resource configuration corresponds to one of the full duplex resource configurations 334, 338, 484-488, 582-588, 684-688, 784-792, and 892-898, and the second full duplex resource configuration corresponds to another of the full duplex resource configurations 334, 338, 484-488, 582-588, 684-688, 784-792, and 892-898.

In some examples, the wireless communication corresponds to the wireless communication 324. To further illustrate, in some examples, performing the wireless communication includes sending, to a UE device, the DMRS based on the DMRS grouping characteristic. For example, the base station 105 may send, to the UE 115, any of the DMRSs 414, 522, 714, 724, or 734 based on the one or more DMRS grouping characteristics 314. In another example, performing the wireless communication includes receiving, from a UE device, the DMRS based on the DMRS grouping characteristic. For example, the base station 105 may receive, from the UE 115, any of the DMRSs 340, 414, 522, 714, 724, or 734 based on the one or more DMRS grouping characteristics 314.

Figure 11:
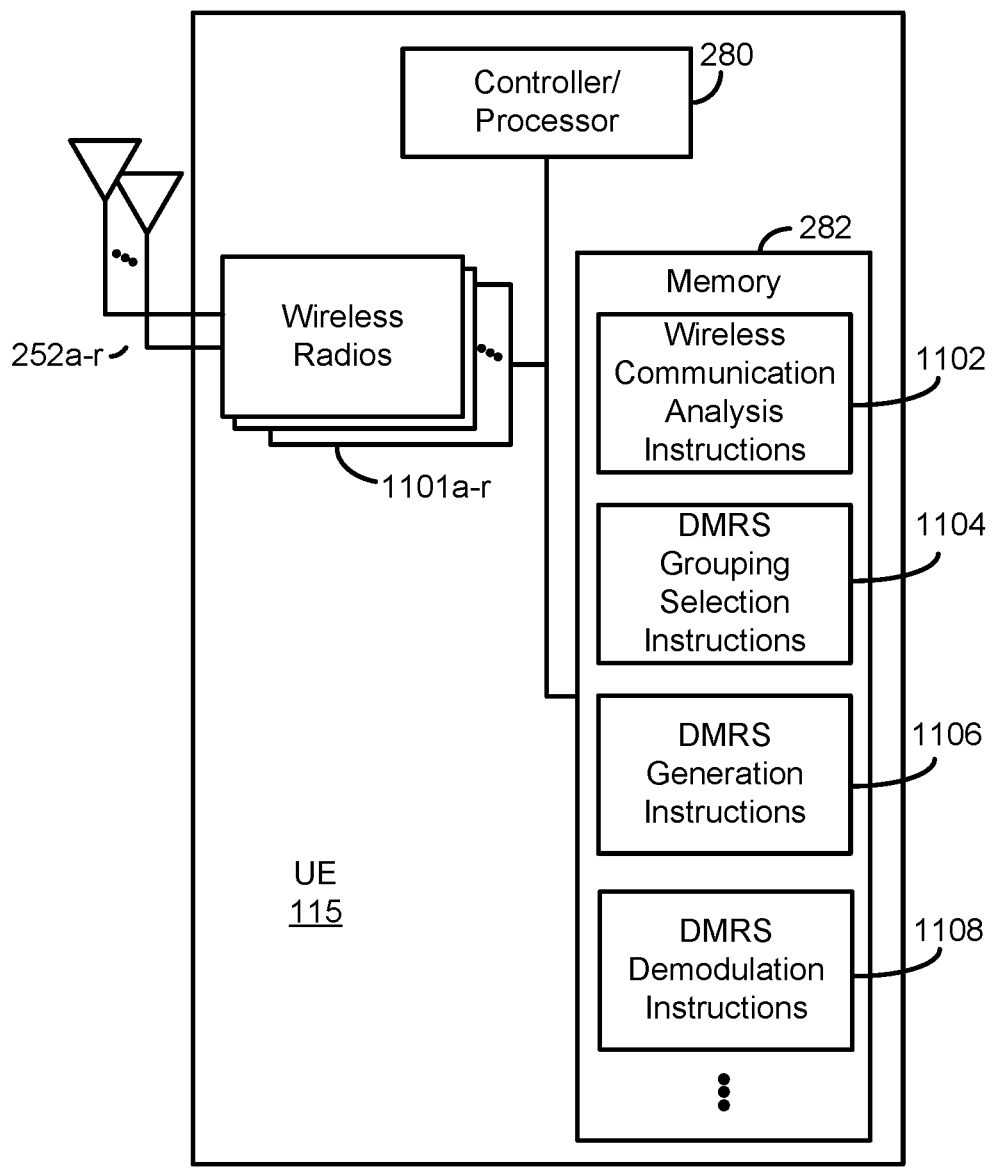
FIG. 11 is a block diagram illustrating an example of a UE configured to perform DMRS grouping operations for full duplex communications according to some aspects of the disclosure.

FIG. 11 is a block diagram illustrating an example of the UE 115 according to some aspects of the disclosure. The UE 115 may include one or more features described with reference to FIG. 2. For example, the UE 115 includes the controller/processor 280, which is configured to execute logic or computer instructions stored in the memory 282 and to control one or more components of UE 115 that provide the features and functionality of UE 115. UE 115, under control of controller/processor 280, transmits and receives signals via wireless radios 1101*a-r* and antennas 252*a-r*. Wireless radios 1101*a-r* include various components and hardware of FIG. 2, including modulator/demodulators 254*a-r*, MIMO detector 256, receive processor 258, transmit processor 264, and TX MIMO processor 266.

The memory 282 is configured to store instructions executable by the controller/processor 280 to initiate, control, or perform one or more operations described herein. For example, the memory 282 may store wireless communication analysis instructions 1102 executable by the controller/processor 280 to analyze one or more aspects of the wireless communication 324 to identify whether a condition 304 is satisfied. As another example, the memory 282 may store DMRS grouping selection instructions 1104 executable by the controller/processor 280 to select a DMRS grouping characteristic 314 based on the one or more conditions 304. As an additional example, the memory 282 may store DMRS generation instructions 1106 executable by the controller/processor 280 to cause the wireless radios 1101*a-r* to generate the wireless communication 324 in accordance with the selected DMRS grouping characteristic 314. Further, the memory 282 may store DMRS demodulation instructions 1108 executable by the controller/processor 280 to demodulate a DMRS received from the base station 105 based on the selected DMRS grouping characteristic 314.

Figure 12:
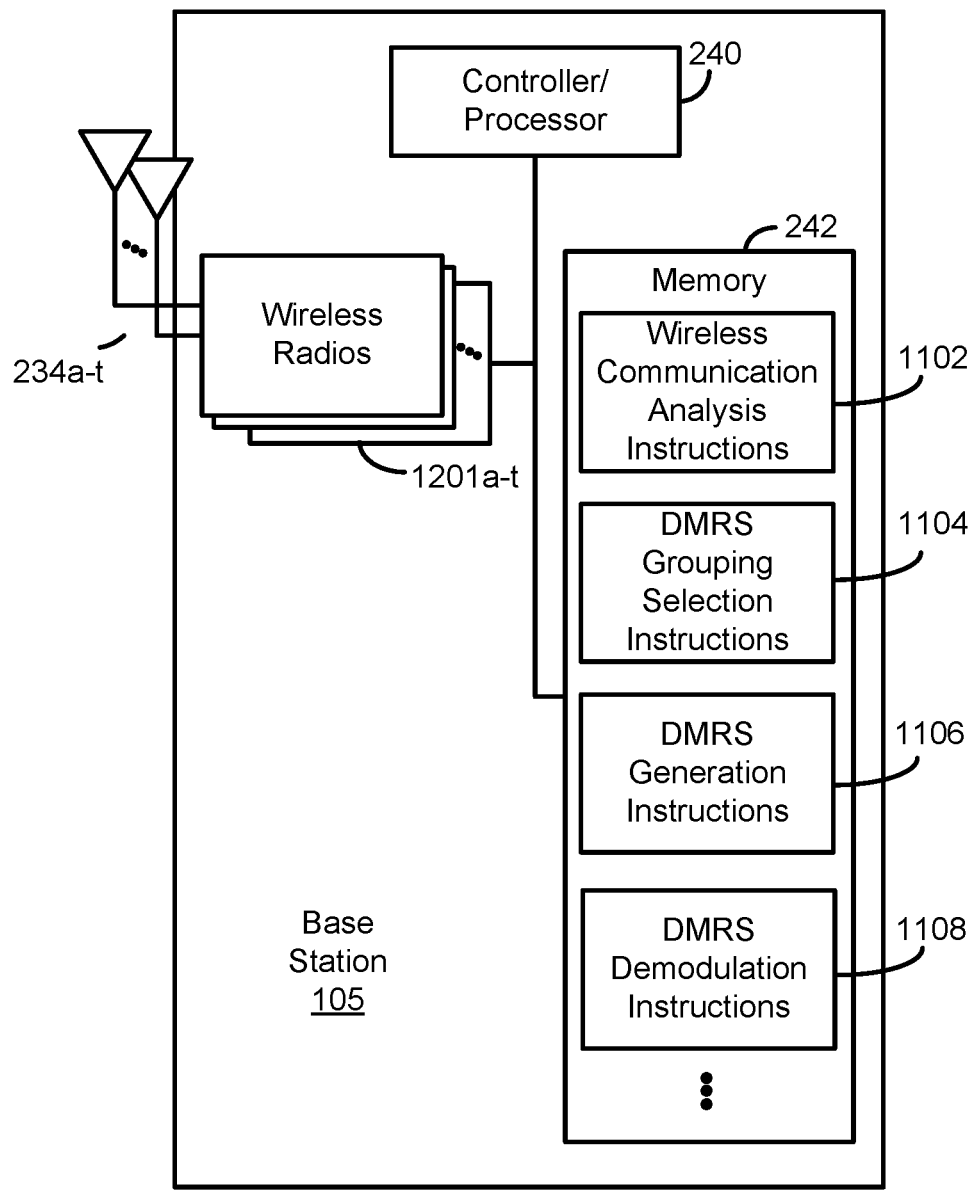
FIG. 12 is a block diagram conceptually illustrating a design of a base station configured to perform DMRS grouping operations for full duplex communications according to some aspects of the disclosure.

FIG. 12 is a block diagram an example of the base station 105 according to some aspects of the disclosure. One or more features of the base station 105 may be as described with reference to FIG. 2. For example, base station 105 includes controller/processor 240, which is configured to execute logic or computer instructions stored in memory 242 and to control one or more components of base station 105 that provide the features and functionality of base station 105. Base station 105, under control of controller/processor 240, transmits and receives signals via wireless radios 1201*a-t* and antennas 234*a-t*. Wireless radios 1201*a-t* include various components and hardware of FIG. 2, including modulator/demodulators 232*a-t*, MIMO detector 236, receive processor 238, transmit processor 220, and TX MIMO processor 230.

The memory 242 is configured to store instructions executable by the controller/processor 240 to initiate, control, or perform one or more operations described herein. For example, the memory 242 may store wireless communication analysis instructions 1102 executable by the controller/processor 240 to analyze one or more aspects of the wireless communication 324 to identify whether a condition 304 is satisfied. As another example, the memory 242 may store DMRS grouping selection instructions 1104 executable by the controller/processor 240 to select a DMRS grouping characteristic 314 based on the one or more conditions 304. As an additional example, the memory 242 may store DMRS generation instructions 1106 executable by the controller/processor 240 to cause the wireless radios 1101*a-r* to generate the wireless communication 324 in accordance with the selected DMRS grouping characteristic 314. Further, the memory 242 may store DMRS demodulation instructions 1108 executable by the controller/processor 240 to demodulate a DMRS received from the base station 105 based on the selected DMRS grouping characteristic 314.

In a first aspect, a method includes: receiving, by a user equipment (UE) device, control information indicating a condition associated with a demodulation reference signal (DMRS) grouping characteristic of a DMRS that is to be wirelessly communicated using one or more physical (PHY) channels; and in response to detecting, by the UE device, that a first full duplex resource configuration associated with a first slot of a plurality of slots of a wireless communication and a second full duplex resource configuration associated with a second slot of the plurality of slots satisfy the condition, performing the wireless communication based on the DMRS grouping characteristic indicated by the control information.

In a second aspect, the plurality of slots each correspond to any collection of consecutive orthogonal frequency-division multiplexing (OFDM) symbols that are full duplex symbols and that have any duration, one or more mini-slots, one or more frames, one or more sub-frames, or any combination thereof.

In a third aspect, the one or more PHY channels include one or more of a physical downlink shared channel (PDSCH), a physical uplink shared channel (PUSCH), a physical downlink control channel (PDCCH), or a physical uplink control channel (PUCCH).

In a fourth aspect, the condition specifies that a first bandwidth of a first portion of the first full duplex resource configuration corresponds to a second bandwidth of a second portion of the second full duplex resource configuration.

In a fifth aspect, the condition specifies that first frequency boundaries of uplink and downlink portions of the first full duplex resource configuration correspond to second frequency boundaries of uplink and downlink portions of the second full duplex resource configuration.

In a sixth aspect, the DMRS grouping characteristic is associated with a first uplink or downlink portion of the first full duplex resource configuration and is further associated with a second uplink or downlink portion of the second full duplex resource configuration, and the condition specifies that first frequency boundaries of the first uplink or downlink portion correspond to second frequency boundaries of the second uplink or downlink portion.

In a seventh aspect, the condition specifies that a first bandwidth of a first portion of the first full duplex resource configuration corresponds to a second bandwidth of a second portion of the second full duplex resource configuration, and the condition further specifies that the first slot is adjacent in time to the second slot.

In an eighth aspect, the condition specifies that first frequency boundaries of uplink and downlink portions of the first full duplex resource configuration correspond to second frequency boundaries of uplink and downlink portions of the second full duplex resource configuration, and the condition further specifies that the first slot is adjacent in time to the second slot.

In a ninth aspect, the DMRS grouping characteristic is associated with a first uplink or downlink portion of the first full duplex resource configuration and is further associated with a second uplink or downlink portion of the second full duplex resource configuration, the condition specifies that first frequency boundaries of the first uplink or downlink portion correspond to second frequency boundaries of the second uplink or downlink portion, and the condition further specifies that the first slot is adjacent in time to the second slot.

In a tenth aspect, the condition specifies that a first bandwidth of a first downlink portion of the first full duplex resource configuration is greater than or equal to a second bandwidth of a second downlink portion of the second full duplex resource configuration, and the condition further specifies that the second bandwidth is greater than or equal to a third bandwidth of a third downlink portion of a third slot of the wireless communication.

In an eleventh aspect, the condition specifies that a first bandwidth of a first downlink portion of the first full duplex resource configuration is greater than or equal to a second bandwidth of a second downlink portion of the second full duplex resource configuration, and the condition further specifies that the first bandwidth is greater than or equal to a third bandwidth of a third downlink portion of a third full duplex resource configuration associated with a third slot of the wireless communication.

In a twelfth aspect, the condition specifies that a first bandwidth of a first downlink portion of the first full duplex resource configuration corresponds to a second bandwidth of a second downlink portion of the second full duplex resource configuration, and the condition further specifies that the first bandwidth corresponds to a third bandwidth of a third downlink portion of a third full duplex resource configuration associated with a third slot of the wireless communication.

In a thirteenth aspect, performing the wireless communication includes sending, to a base station, the DMRS based on the DMRS grouping characteristic.

In a fourteenth aspect, performing the wireless communication includes receiving, from a base station, the DMRS based on the DMRS grouping characteristic.

In a fifteenth aspect, the method includes any combination of the first through fourteenth aspects.

In a sixteenth aspect, a method of wireless communication includes: receiving, by a base station, control information indicating a condition associated with a demodulation reference signal (DMRS) grouping characteristic of a DMRS that is to be wirelessly communicated using one or more physical (PHY) channels; and in response to detecting, by the base station, that a first full duplex resource configuration associated with a first slot of a plurality of slots of a wireless communication and a second full duplex resource configuration associated with a second slot of the plurality of slots satisfy the condition, performing the wireless communication based on the DMRS grouping characteristic indicated by the control information.

In a seventeenth aspect, the plurality of slots each correspond to any collection of consecutive orthogonal frequency-division multiplexing (OFDM) symbols that are full duplex symbols and that have any duration, one or more mini-slots, one or more frames, one or more sub-frames, or any combination thereof.

In an eighteenth aspect, the one or more PHY channels include one or more of a physical downlink shared channel (PDSCH), a physical uplink shared channel (PUSCH), a physical downlink control channel (PDCCH), or a physical uplink control channel (PUCCH).

In a nineteenth aspect, the condition specifies that a first bandwidth of a first portion of the first full duplex resource configuration corresponds to a second bandwidth of a second portion of the second full duplex resource configuration.

In a twentieth aspect, the condition specifies that first frequency boundaries of uplink and downlink portions of the first full duplex resource configuration correspond to second frequency boundaries of uplink and downlink portions of the second full duplex resource configuration.

In a twenty-first aspect, the DMRS grouping characteristic is associated with a first uplink or downlink portion of the first full duplex resource configuration and is further associated with a second uplink or downlink portion of the second full duplex resource configuration, and the condition specifies that first frequency boundaries of the first uplink or downlink portion correspond to second frequency boundaries of the second uplink or downlink portion.

In a twenty-second aspect, the condition specifies that a first bandwidth of a first portion of the first full duplex resource configuration corresponds to a second bandwidth of a second portion of the second full duplex resource configuration, and the condition further specifies that the first slot is adjacent in time to the second slot.

In a twenty-third aspect, the condition specifies that first frequency boundaries of uplink and downlink portions of the first full duplex resource configuration correspond to second frequency boundaries of uplink and downlink portions of the second full duplex resource configuration, and the condition further specifies that the first slot is adjacent in time to the second slot.

In a twenty-fourth aspect, the DMRS grouping characteristic is associated with a first uplink or downlink portion of the first full duplex resource configuration and is further associated with a second uplink or downlink portion of the second full duplex resource configuration, the condition specifies that first frequency boundaries of the first uplink or downlink portion correspond to second frequency boundaries of the second uplink or downlink portion, and the condition further specifies that the first slot is adjacent in time to the second slot.

In a twenty-fifth aspect, the condition specifies that a first bandwidth of a first downlink portion of the first full duplex resource configuration is greater than or equal to a second bandwidth of a second downlink portion of the second full duplex resource configuration, and the condition further specifies that the second bandwidth is greater than or equal to a third bandwidth of a third downlink portion of a third slot of the wireless communication.

In a twenty-sixth aspect, the condition specifies that a first bandwidth of a first downlink portion of the first full duplex resource configuration is greater than or equal to a second bandwidth of a second downlink portion of the second full duplex resource configuration, and the condition further specifies that the first bandwidth is greater than or equal to a third bandwidth of a third downlink portion of a third full duplex resource configuration associated with a third slot of the wireless communication.

In a twenty-seventh aspect, the condition specifies that a first bandwidth of a first downlink portion of the first full duplex resource configuration corresponds to a second bandwidth of a second downlink portion of the second full duplex resource configuration, and the condition further specifies that the first bandwidth corresponds to a third bandwidth of a third downlink portion of a third full duplex resource configuration associated with a third slot of the wireless communication.

In a twenty-eighth aspect, performing the wireless communication includes sending, to a user equipment (UE) device, the DMRS based on the DMRS grouping characteristic.

In a twenty-ninth aspect, performing the wireless communication includes receiving, from a user equipment (UE) device, the DMRS based on the DMRS grouping characteristic.

In a thirtieth aspect, the method includes any combination of the sixteenth through twenty-ninth aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to FIGS. 1-12 may be implemented via specialized processor circuitry, via executable instructions, and/or combinations thereof.

Those of skill would further appreciate that the various illustrative logical blocks, modules, circuits, and operations (e.g., the logical blocks in FIGS. 9 and 10) described in connection with the disclosure herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The operations of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, the method comprising:
   receiving, by a user equipment (UE) device, control information indicating a condition associated with a demodulation reference signal (DMRS) grouping characteristic of a DMRS that is associated with one or more physical (PHY) channels; and
   in response to detecting, by the UE device, that a first bandwidth of a first full duplex resource configuration associated with a first slot of a plurality of slots of a wireless communication, a second bandwidth of a second full duplex resource configuration associated with a second slot of the plurality of slots, and a third bandwidth of a third downlink portion of a third full duplex resource configuration associated with a third slot of the plurality of slots satisfy the condition, associating the DMRS with the first slot and the second slot in accordance with the DMRS grouping characteristic indicated by the control information.

2. The method of claim 1, wherein the one or more PHY channels include one or more of a physical downlink shared channel (PDSCH), a physical uplink shared channel (PUSCH), a physical downlink control channel (PDCCH), or a physical uplink control channel (PUCCH).

3. The method of claim 1, wherein the condition specifies that the first bandwidth corresponds to the second bandwidth.

4. The method of claim 1, wherein the condition specifies that first frequency boundaries of uplink and downlink portions of the first full duplex resource configuration correspond to second frequency boundaries of uplink and downlink portions of the second full duplex resource configuration.

5. The method of claim 1, wherein the DMRS grouping characteristic is associated with a first uplink or downlink portion of the first full duplex resource configuration and is further associated with a second uplink or downlink portion of the second full duplex resource configuration, and wherein the condition specifies that first frequency boundaries of the first uplink or downlink portion correspond to second frequency boundaries of the second uplink or downlink portion.

6. The method of claim 1, wherein the condition specifies that the first bandwidth corresponds to the second bandwidth, and wherein the condition further specifies that the first slot is adjacent in time to the second slot.

7. The method of claim 1, wherein the one or more PHY channels include an uplink channel, and further comprising transmitting the DMRS via the uplink channel in accordance with the DMRS grouping characteristic and during the plurality of slots.

8. A method of wireless communication, the method comprising:
   receiving, by a network node, control information indicating a condition associated with a demodulation reference signal (DMRS) grouping characteristic of a DMRS that is associated with one or more physical (PHY) channels; and
   in response to detecting, by the network node, that a first bandwidth of a first full duplex resource configuration associated with a first slot of a plurality of slots of a wireless communication, a second bandwidth of a second full duplex resource configuration associated with a second slot of the plurality of slots, and a third bandwidth of a third downlink portion of a third full duplex resource configuration associated with a third slot of the plurality of slots satisfy the condition, associating the DMRS with the first slot and the second slot in accordance with the DMRS grouping characteristic indicated by the control information.

9. The method of claim 8, wherein the plurality of slots each correspond to any collection of consecutive orthogonal frequency-division multiplexing (OFDM) symbols that are full duplex symbols and that have any duration, one or more mini-slots, one or more frames, one or more sub-frames, or any combination thereof.

10. The method of claim 8, wherein the condition specifies that the first bandwidth corresponds to the second bandwidth.

11. The method of claim 8, wherein the condition specifies that first frequency boundaries of uplink and downlink portions of the first full duplex resource configuration correspond to second frequency boundaries of uplink and downlink portions of the second full duplex resource configuration.

12. An apparatus for wireless communication, the apparatus comprising:
   a memory; and
   one or more processors coupled to the memory and configured to:
     receive control information indicating a condition associated with a demodulation reference signal (DMRS) grouping characteristic of a DMRS that is associated with one or more physical (PHY) channels; and
     in response to detecting that a first bandwidth of a first full duplex resource configuration associated with a first slot of a plurality of slots of a wireless communication, a second bandwidth of a second full duplex resource configuration associated with a second slot of the plurality of slots, and a third bandwidth of a third downlink portion of a third full duplex resource configuration associated with a third slot of the plurality of slots satisfy the condition, associate the DMRS with the first slot and the second slot in accordance with the DMRS grouping characteristic indicated by the control information.

13. The apparatus of claim 12, wherein the condition specifies that first frequency boundaries of uplink and downlink portions of the first full duplex resource configuration correspond to second frequency boundaries of uplink and downlink portions of the second full duplex resource configuration, and wherein the condition further specifies that the first slot is adjacent in time to the second slot.

14. The apparatus of claim 12, wherein the DMRS grouping characteristic is associated with a first uplink or downlink portion of the first full duplex resource configuration and is further associated with a second uplink or downlink portion of the second full duplex resource configuration, wherein the condition specifies that first frequency boundaries of the first uplink or downlink portion correspond to second frequency boundaries of the second uplink or downlink portion, and wherein the condition further specifies that the first slot is adjacent in time to the second slot.

15. The apparatus of claim 12, wherein the condition specifies that the first bandwidth is greater than or equal to the second bandwidth, and wherein the condition further specifies that the second bandwidth is greater than or equal to the third bandwidth.

16. The apparatus of claim 12, wherein the condition specifies that the first bandwidth is greater than or equal to the second bandwidth, and wherein the condition further specifies that the first bandwidth is greater than or equal to the third bandwidth.

17. The apparatus of claim 12, wherein the condition specifies that the first bandwidth corresponds to the second bandwidth, and wherein the condition further specifies that the first bandwidth corresponds to the third bandwidth.

18. The apparatus of claim 12, wherein the one or more processors are further configured to send, in connection with the wireless communication and to a network node, the DMRS in accordance with the DMRS grouping characteristic.

19. The apparatus of claim 12, wherein the one or more processors are further configured to receive, in connection with the wireless communication and from a network node, the DMRS in accordance with the DMRS grouping characteristic.

20. An apparatus for wireless communication, the apparatus comprising:
a memory; and
one or more processors coupled to the memory and configured to:
transmit control information indicating a condition associated with a demodulation reference signal (DMRS) grouping characteristic of a DMRS that is associated with one or more physical (PHY) channels; and
in response to detecting that a first bandwidth of a first full duplex resource configuration associated with a first slot of a plurality of slots of a wireless communication, a second bandwidth of a second full duplex resource configuration associated with a second slot of the plurality of slots, and a third bandwidth of a third downlink portion of a third full duplex resource configuration associated with a third slot of the plurality of slots satisfy the condition, associate the DMRS with the first slot and the second slot in accordance with the DMRS grouping characteristic indicated by the control information.

21. The apparatus of claim 20, wherein the DMRS grouping characteristic is associated with a first uplink or downlink portion of the first full duplex resource configuration and is further associated with a second uplink or downlink portion of the second full duplex resource configuration, and wherein the condition specifies that first frequency boundaries of the first uplink or downlink portion correspond to second frequency boundaries of the second uplink or downlink portion.

22. The apparatus of claim 20, wherein the condition specifies that the first bandwidth corresponds to the second bandwidth, and wherein the condition further specifies that the first slot is adjacent in time to the second slot.

23. The apparatus of claim 20, wherein the condition specifies that first frequency boundaries of uplink and downlink portions of the first full duplex resource configuration correspond to second frequency boundaries of uplink and downlink portions of the second full duplex resource configuration, and wherein the condition further specifies that the first slot is adjacent in time to the second slot.

24. The apparatus of claim 20, wherein the DMRS grouping characteristic is associated with a first uplink or downlink portion of the first full duplex resource configuration and is further associated with a second uplink or downlink portion of the second full duplex resource configuration, wherein the condition specifies that first frequency boundaries of the first uplink or downlink portion correspond to second frequency boundaries of the second uplink or downlink portion, and wherein the condition further specifies that the first slot is adjacent in time to the second slot.

25. The apparatus of claim 20, wherein the condition specifies that the first bandwidth is greater than or equal to the second bandwidth, and wherein the condition further specifies that the second bandwidth is greater than or equal to the third bandwidth.

26. The apparatus of claim 20, wherein the condition specifies that the first bandwidth is greater than or equal to the second bandwidth, and wherein the condition further specifies that the first bandwidth is greater than or equal to the third bandwidth.

27. The apparatus of claim 20, wherein the condition specifies that the first bandwidth corresponds to the second bandwidth, and wherein the condition further specifies that the first bandwidth corresponds to the third bandwidth.

28. The apparatus of claim 20, wherein the condition specifies that the first bandwidth is greater than or equal to the second bandwidth.

29. The apparatus of claim 20, wherein the condition specifies that the second bandwidth is greater than or equal to the third bandwidth.

* * * * *